(12) United States Patent
Harada et al.

(10) Patent No.: US 7,852,552 B2
(45) Date of Patent: *Dec. 14, 2010

(54) OBSERVATION APPARATUS PROVIDED WITH IMMERSION OBJECTIVE LENS

(75) Inventors: Mitsuo Harada, Hachioji (JP); Yoshihiro Shimada, Sagamihara (JP)

(73) Assignee: Olympus Corporation, Tokyo (JP)

( * ) Notice: Subject to any disclaimer, the term of this patent is extended or adjusted under 35 U.S.C. 154(b) by 415 days.

This patent is subject to a terminal disclaimer.

(21) Appl. No.: 11/970,210

(22) Filed: Jan. 7, 2008

(65) Prior Publication Data

US 2008/0170292 A1  Jul. 17, 2008

(30) Foreign Application Priority Data

Jan. 15, 2007  (JP) ............................. 2007-005876

(51) Int. Cl.
*G02B 21/00* (2006.01)
(52) U.S. Cl. ...................................... 359/368; 359/896
(58) Field of Classification Search .......... 359/368–390
See application file for complete search history.

(56) References Cited

U.S. PATENT DOCUMENTS

| | | | | |
|---|---|---|---|---|
| 6,980,293 B1 * | 12/2005 | Harada | ......................... | 356/317 |
| 7,602,494 B2 * | 10/2009 | Harada et al. | ................ | 356/417 |
| 2005/0022731 A1 | 2/2005 | Petrillo et al. | | |

FOREIGN PATENT DOCUMENTS

| | | |
|---|---|---|
| EP | 1717630 A1 | 11/2006 |
| EP | 1936424 A2 | 6/2008 |
| JP | 2005062687 | 8/2003 |
| JP | 2004531765 | 10/2004 |
| JP | 2005-62687 * | 3/2005 .................. 359/368 |
| WO | 02093232 A2 | 11/2002 |

OTHER PUBLICATIONS

Extended European Search Report, dated May 27, 2008, in corresponding foreign application, 8 pp.
European Search Report dated. Sep. 2, 2009.

* cited by examiner

Primary Examiner—Thong Nguyen
(74) Attorney, Agent, or Firm—Pillsbury Winthrop Shaw Pittman, LLP

(57) ABSTRACT

An observation apparatus for observing an observation object mounted at an observation position on a stage through an immersion objective lens placed below the observation object. The observation apparatus has a liquid pouring device, constructed to be relatively movable with respect to the immersion objective lens, pouring a liquid on a top lens surface of the immersion objective lens from the upper side of the immersion objective lens at a distance from the observation position on the stage; and a position control device automatically adjusting relative positions of a liquid pouring position of the liquid pouring device and the immersion objective lens and automatically adjusting relative positions of the immersion objective lens on which the liquid is poured by the liquid pouring device and a desired observation position on the stage.

12 Claims, 5 Drawing Sheets

US 7,852,552 B2

OBSERVATION APPARATUS PROVIDED WITH IMMERSION OBJECTIVE LENS

This application claims benefits of Japanese Application No. 2007-5876 filed in Japan on Jan. 15, 2007, the contents of which are incorporated herein by reference.

BACKGROUND OF THE INVENTION

1. Field of the Invention

This invention relates to an observation apparatus provided with an immersion objective lens in which a liquid is interposed between an observation object, such as a living specimen, and an objective lens placed below the observation object and thereby observations are carried out, and in particular, to an observation apparatus provided with an immersion objective lens which is suitable for a microplate sample observation and a time-lapse observation, or an observation combining these.

2. Description of Related Art

In a conventional inverted microscope provided with an immersion objective lens, a common method of supplying a liquid to the immersion objective lens in microscopy is to manually pour the liquid by using a pipette. However, when a plurality of specimens are observed like the microplate sample observation and the time-lapse observation, or when a particular specimen is discontinuously observed for a long term, it is troublesome to manually pour the liquid with the pipette each time the necessity arises, and in addition, this imposes a load on a viewer. Thus, in the observation in which the inverted microscope provided with this type of immersion objective lens is used, the structure that the liquid can be automatically supplied to the immersion objective lens is proposed, for example, by Japanese Patent Publication No. 2004-531765.

FIG. 1 shows the structure that the liquid is automatically supplied to the immersion objective lens, set forth in Publication No. 2004-531765. In FIG. 1, a supplier 51 provided as a liquid pouring means for supplying the liquid to the immersion objective lens is fixed to the immersion objective lens 52, and a supply tube 51a provided at the top of the supplier 51 extends close to a top lens 52a of the immersion objective lens 52 from the side of the immersion objective lens 52. The structure is such that the liquid can be automatically poured, through the supply tube 51a, between the top lens 52a of the immersion objective lens 52 and a specimen 54 supported by a specimen holder 53.

In the structure set forth in Publication No. 2004-531765, a trough-shaped absorption means 55 provided as a discharge means is placed around the immersion objective lens 52 and a discharge tube 56 is connected to the absorption means 55. A liquid flowing from the top lens 52a of the immersion objective lens 52 is stored in the absorption means 55 so that a stored liquid can be discharged through the discharge tube 56.

SUMMARY OF THE INVENTION

The observation apparatus provided with the immersion objective lens according to the present invention, in which an observation object mounted at an observation position on a stage is observed through the immersion objective lens placed below the observation object, comprises a liquid pouring means, constructed to be relatively movable with respect to the immersion objective lens, pouring a liquid on a top lens surface of the immersion objective lens from the upper side of the immersion objective lens at a distance from the observation position on the stage; and a position control means automatically adjusting relative positions of a liquid pouring position of the liquid pouring means and the immersion objective lens and automatically adjusting relative positions of the immersion objective lens on which the liquid is poured by the liquid pouring means and a desired observation position on the stage.

In the observation apparatus provided with the immersion objective lens of the present invention, it is desirable that the liquid pouring means has a liquid pouring section for pouring the liquid perpendicular to the top lens surface of the immersion objective lens located at the liquid pouring position.

In the observation apparatus provided with the immersion objective lens of the present invention, it is desirable that the liquid pouring means is constructed so that the liquid pouring section is relatively movable with respect to the stage.

In the observation apparatus provided with the immersion objective lens of the present invention, it is desirable that the liquid pouring means is constructed so that the liquid pouring section is movable together with the stage.

In the observation apparatus provided with the immersion objective lens of the present invention, it is desirable that the position control means is constructed so that the immersion objective lens can be moved by a desired amount in a horizontal direction.

In the observation apparatus provided with the immersion objective lens of the present invention, it is desirable that the position control means is constructed so that the stage can be moved by a desired amount in a horizontal direction.

In the observation apparatus provided with the immersion objective lens of the present invention, it is desirable that the position control means is constructed so that the liquid pouring section of the liquid pouring means can be moved by a desired amount in a horizontal direction.

In the observation apparatus provided with the immersion objective lens of the present invention, it is desirable that the position control means is further constructed so that the immersion objective lens can be moved by a desired amount in a vertical direction.

In the observation apparatus provided with the immersion objective lens of the present invention, it is desirable that the position control means is further constructed so that the stage can be moved by a desired amount in a vertical direction.

In the observation apparatus provided with the immersion objective lens of the present invention, it is desirable that the position control means is further constructed so that the liquid pouring section can be moved by a desired amount in a vertical direction.

In the observation apparatus provided with the immersion objective lens of the present invention, it is desirable to further have a liquid receiving portion storing a liquid flowing from the top lens surface mounted around the immersion objective lens; and a suction means, constructed to be relatively movable with respect to the immersion objective lens, for pumping up the liquid stored in the liquid receiving portion of the immersion objective lens at a distance from the observation position on the stage.

In the observation apparatus provided with the immersion objective lens of the present invention, it is desirable that the suction means has a suction portion which can be submerged perpendicular to a surface of the liquid stored in the liquid receiving portion of the immersion objective lens.

In the observation apparatus provided with the immersion objective lens of the present invention, it is desirable that the suction portion is movable with respect to a position where the suction portion is submerged perpendicular to the surface of the liquid stored in the liquid receiving portion of the immersion objective lens and a position where the suction portion deviates from the surface of the liquid stored in the liquid receiving portion.

In the observation apparatus provided with the immersion objective lens of the present invention, it is desirable that the suction portion is constructed with a tubular member which extends horizontally in a longitudinal direction and in which a top is bent, and has a rotary axis in the longitudinal direction of the tubular member so that the rotary axis is rotated and thereby the top of the suction portion is moved in directions in which the top is submerged perpendicular to the surface of the liquid stored in the liquid receiving portion and in which it deviates from the surface of the liquid.

In the observation apparatus provided with the immersion objective lens of the present invention, it is desirable that the suction portion is constructed with a tubular member which extends horizontally in a longitudinal direction and in which a top is bent, and has a rotary axis in a horizontal direction perpendicular to the longitudinal direction of the tubular member so that the rotary axis is rotated and thereby the top of the suction portion is moved in directions in which the top is submerged perpendicular to the surface of the liquid stored in the liquid receiving portion and in which it deviates from the surface of the liquid.

In the observation apparatus provided with the immersion objective lens of the present invention, it is desirable that the suction means is supported by a support member common with the liquid pouring means, and when the top lens surface of the immersion objective lens is located at the liquid pouring position of the liquid pouring means, the top of the suction portion is located at a position where the top can be submerged perpendicular to the surface of the liquid stored in the liquid receiving portion.

In the observation apparatus provided with the immersion objective lens of the present invention, it is desirable that the liquid pouring portion of the liquid pouring means and the suction portion of the suction means are constructed with a common tubular member and are supported by a common supporting member.

In the observation apparatus provided with the immersion objective lens of the present invention, it is desirable that a cleaning member for cleaning the top lens surface of the immersion objective lens is further provided at a distance from the observation position on the stage, and the position control means is constructed so that relative positions of the immersion objective lens and the cleaning member can be shifted and the top lens surface of the immersion objective lens can be rubbed against the cleaning member.

In the observation apparatus provided with the immersion objective lens of the present invention, it is desirable that the cleaning member is provided on the lower surface of the stage.

In the observation apparatus provided with the immersion objective lens of the present invention, it is desirable that the cleaning member is provided on the lower surface of the supporting member supporting the liquid pouring means.

In the observation apparatus provided with the immersion objective lens of the present invention, it is desirable that the cleaning member is provided on the lower surface of the supporting member supporting the suction means.

In the observation apparatus provided with the immersion objective lens of the present invention, it is desirable that the immersion objective lens is provided to be exchangeable.

In the observation apparatus provided with the immersion objective lens of the present invention, it is desirable to have a revolver in which a plurality of immersion objective lenses can be switched.

In the observation apparatus provided with the immersion objective lens of the present invention, it is desirable to make sequence control comprising the steps of:

(step 1) moving one of the stage and the immersion objective lens in a preset direction through the position control means to remove the observation position on the stage from the optical axis of the immersion objective lens;

(step 2) moving at least one of the stage, the immersion objective lens, and the liquid pouring means in a preset direction through the position control means to make positional adjustment so that the liquid pouring position of the liquid pouring means is located in the proximity of the top lens surface of the immersion objective lens;

(step 3) pouring a preset amount of liquid on the top lens surface of the immersion objective lens through the liquid pouring means;

(step 4) moving at least one of the stage, the immersion objective lens, and the liquid pouring means in a preset direction through the position control means to remove the liquid pouring position of the liquid pouring means from the proximity of the top lens surface of the immersion objective lens;

(step 5) moving one of the stage and the immersion objective lens in a preset direction through the position control means to make positional adjustment so that a desired observation object mounted at the observation position on the stage is located on the optical axis of the immersion objective lens;

(step 6) moving the immersion objective lens in a direction of the optical axis with respect to the desired observation object mounted at the observation position on the stage into alignment with the observation object; and (step 7) forming an image of the observation object aligned.

In the observation apparatus provided with the immersion objective lens of the present invention, it is desirable to make sequence control comprising the steps of:

(step 1) moving one of the stage and the immersion objective lens in a preset direction through the position control means to remove the observation position on the stage from the optical axis of the immersion objective lens;

(step 2) moving at least one of the stage, the immersion objective lens, the liquid pouring means, and the suction means in a preset direction through the position control means to make positional adjustment so that the liquid pouring position of the liquid pouring means is located in the proximity of the top lens surface of the immersion objective lens and so that a suction position of the suction means is located at the liquid receiving portion of the immersion objective lens;

(step 3) pouring a preset amount of liquid on the top lens surface of the immersion objective lens through the liquid pouring means and pumping up the liquid stored in the liquid receiving portion of the immersion objective lens through the suction means;

(step 4) moving at least one of the stage, the immersion objective lens, the liquid pouring means, and the suction means in a preset direction through the position control means to remove the liquid pouring position of the liquid pouring means from the proximity of the top lens surface of the immersion objective lens and to remove the suction position of the suction means from the liquid receiving portion of the immersion objective lens;

(step 5) moving one of the stage and the immersion objective lens in a preset direction through the position control means to make positional adjustment so that a desired observation object mounted at the observation position on the stage is located on the optical axis of the immersion objective lens;

(step 6) moving the immersion objective lens in a direction of the optical axis with respect to the desired observation object mounted at the observation position on the stage into alignment with the observation object; and (step 7) forming an image of the observation object aligned.

In the observation apparatus provided with the immersion objective lens of the present invention, it is desirable that, in any one of steps 1, 2, 4, and 5, the top lens surface of the immersion objective lens is rubbed against the cleaning member.

According to the observation apparatus provided with the immersion objective lens of the present invention, the liquid can be automatically poured and the shift of the position of the liquid pouring means can be prevented; the exchange of various objective lenses can be operated; the contamination of the immersion objective lens is easily removed; and a high-precision observation can be carried out.

These and other features and advantages of the present invention will become apparent from the following detailed description of the preferred embodiments when taken in conjunction with the accompanying drawings.

DETAILED DESCRIPTION OF THE PREFERRED EMBODIMENTS

First Embodiment

Figure 1:
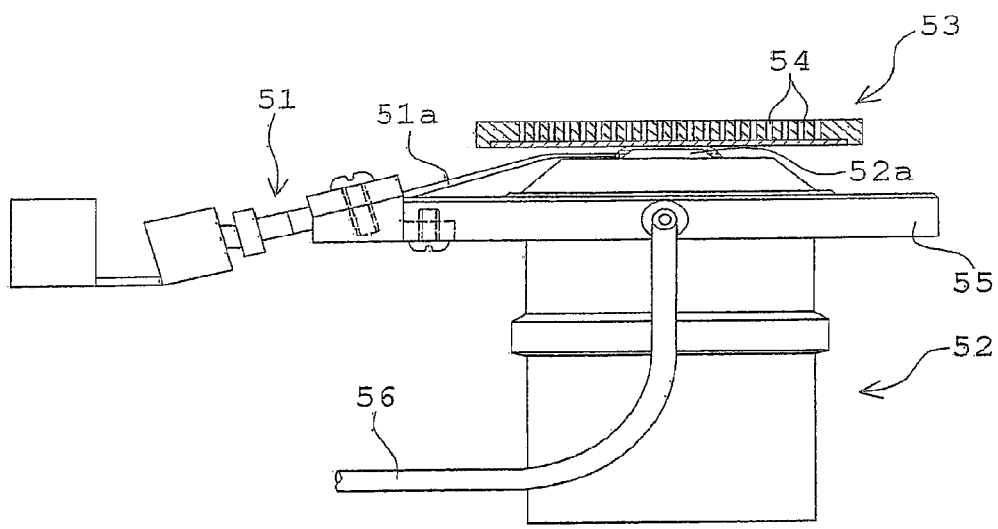
FIG. 1 is an explanatory view showing a conventional example of the structure that the liquid is automatically poured on the immersion objective lens.
Figure 2:
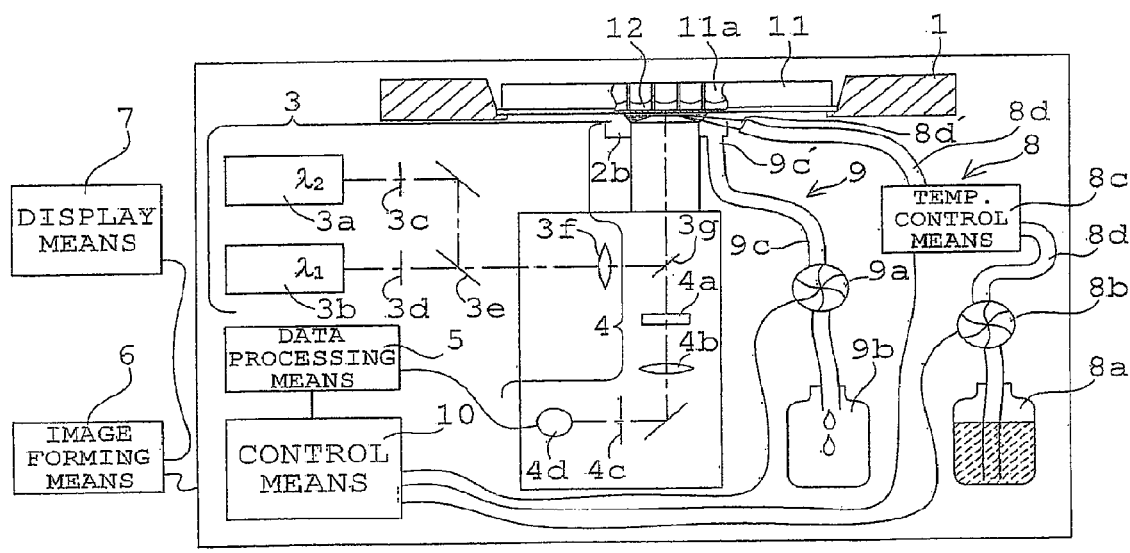
FIG. 2 is a conceptual view showing the general structure of the inverted microscope provided with the immersion objective lens, using the structure of FIG. 1 as a comparative example in the present invention.
Figure 3:
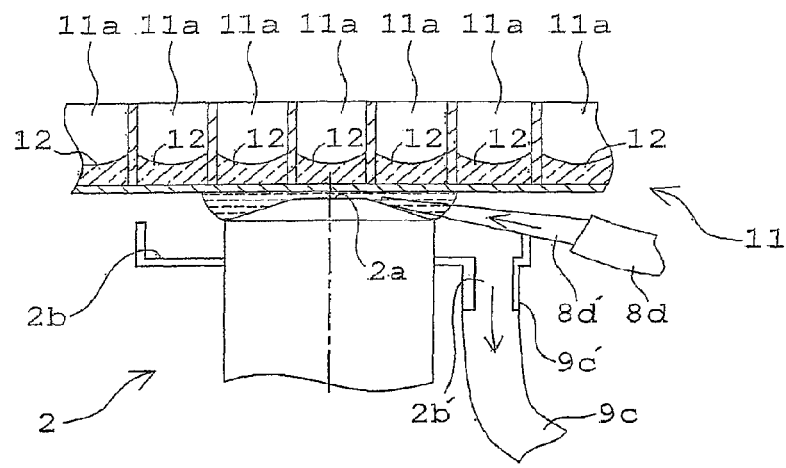
FIG. 3 is an enlarged view showing essential parts of FIG. 2.
Figure 4:
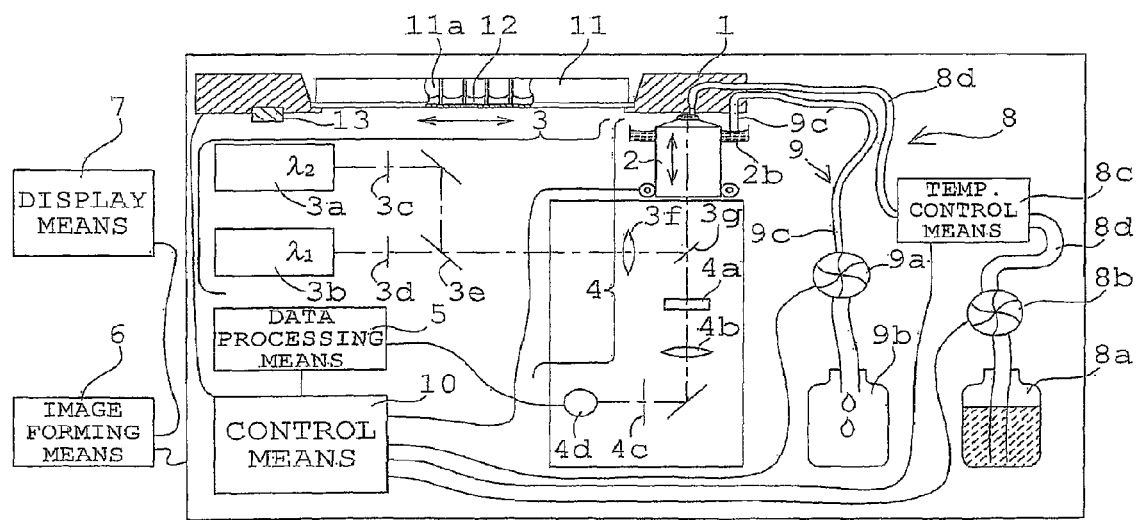
FIG. 4 is a conceptual view showing the general structure of the inverted microscope which is the observation apparatus provided with the immersion objective lens according to a first embodiment in the present invention.
Figure 5:
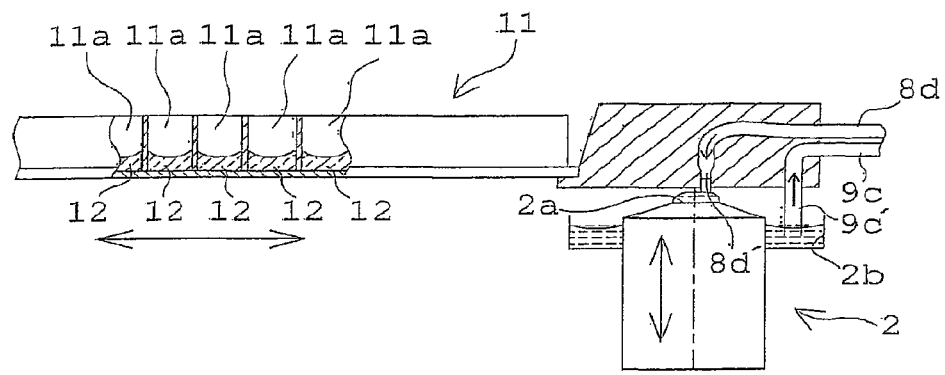
FIG. 5 is an enlarged view showing essential parts of FIG. 4.
Figure 9:
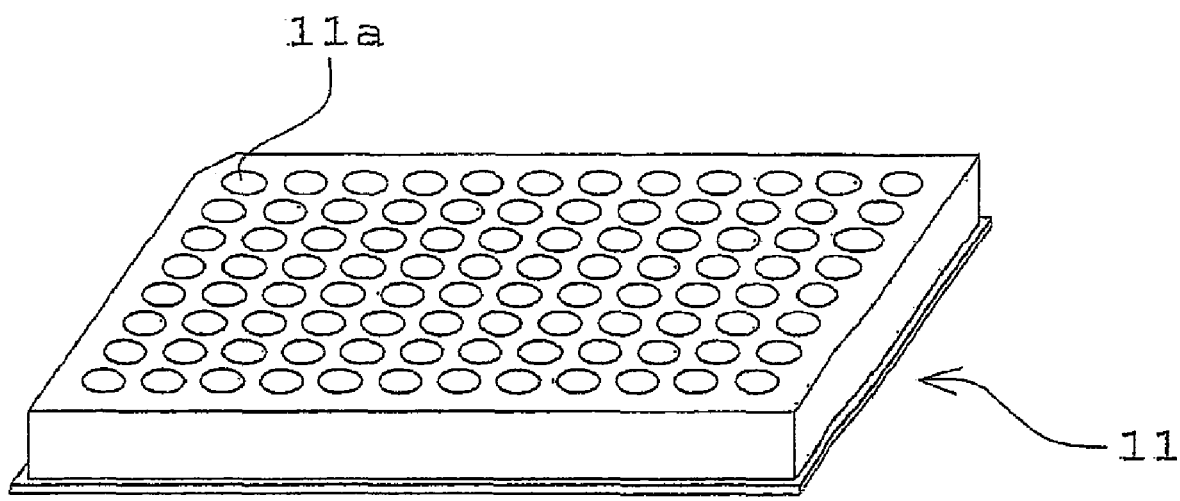
FIG. 9 is an explanatory view showing the appearance of a specimen vessel used in the inverted microscope of each of FIGS. 4 and 2.

FIG. 4 shows the general structure of an inverted microscope which is the observation apparatus provided with the immersion objective lens according to the first embodiment in the present invention, and FIG. 5 shows essential parts of FIG. 4. FIG. 2 shows the general structure of the inverted microscope provided with the immersion objective lens, using the structure of FIG. 1 as a comparative example in the present invention, and FIG. 3 shows essential parts of FIG. 2. FIG. 9 shows the appearance of a specimen vessel used in the inverted microscope of each of FIGS. 4 and 2.

The structure common to the inverted microscopes in the first embodiment and the comparative example will first be described.

The inverted microscope provided with the immersion objective lens in each of the first embodiment of FIG. 4 and the modified example of FIG. 2 includes a stage 1 on which an observation object is mounted at an observation position; an immersion objective lens 2 placed below the stage 1; an illumination means 3 illuminating the observation object with light of preset wavelength (for example, excitation wavelength); an observation means 4 receiving desired observation light from an illuminated observation object; a data processing means (a data processing device) 5 processing the observation light received by the observation means 4; an image-forming means (an image-forming device) 6 forming an image in accordance with information processed by the data processing means 5; an image display means (a display device) 7 displaying the image formed by the image-forming means 6; a liquid pouring means 8 pouring a liquid on the immersion objective lens 2; a discharge means 9 discharging the liquid poured on the immersion objective lens 2; and a control means 10 carrying out preset control.

At the observation position on the stage 1, a plate 11 provided with a large number of wells 11a is placed as a specimen vessel. Each of the wells 11a incorporates a specimen 12 as the observation object.

The illumination means 3 is constructed with illumination light sources 3a and 3b, each emitting light of a different excitation wavelength; excitation filters 3c and 3d; a path combining means 3e; an illumination lens 3f; a dichroic mirror 3g; and the immersion objective lens 2.

The observation means 4 has the immersion objective lens 2, the dichroic mirror 3g, a band-pass filter 4a, an imaging lens 4b, a confocal aperture 4c, and an image sensor 4d. As the image sensor 4d, for example, a photodiode, a photomultiplier, or a CCD can be used.

Also, in the illumination means 3, any structure that allows the observation object to be illuminated with light of preset wavelength (for example, excitation wavelength) through the immersion objective lens 2 is applicable.

In the observation means 4, any structure that allows a desired observation light from the illuminated observation object to be received through the immersion objective lens 2 is applicable.

Further, the inverted microscope in each of the first embodiment of FIG. 4 and the comparative example of FIG. 2 is constructed to have the illumination means 3, the observation means 4, the processing means 5, the image-forming means 6, and the image display means 7, but any structure that has the function of the inverted microscope provided with the immersion objective lens 2 is applicable.

On the periphery of the immersion objective lens 2, as shown in FIGS. 5 and 3, a liquid receiving portion 2b is provided which is configured with an annular groove for storing the liquid flowing from a top lens surface 2a of the immersion objective lens 2.

The liquid pouring means 8 has a receptacle 8a for the liquid to be poured as a medium interposed between the specimen 12 and the immersion objective lens 2, a pump 8b feeding the liquid admitted to the receptacle 8a in a direction in which the liquid is poured, a temperature control means 8c controlling the temperature of the liquid, and a liquid pouring tube 8d through which the liquid to be poured passes. Also, the liquid pouring means 8 may be constructed not to have the temperature control means 8c.

The discharge means 9 has a pump 9a feeding the liquid stored in the liquid receiving portion 2b of the immersion objective lens 2 in a direction in which the liquid is discharged, a receptacle 9b storing a discharged liquid, and a discharge tube 9c through which the liquid to be discharged passes.

The control means 10 is connected to the data processing means 5, the pump 8b, the temperature control means 8c, and the pump 9a. The control means 10 is constructed to send a control signal for performing preset processing relative to observation information received by the image sensor 4d with respect to the data processing means 5, a preset control signal for pumping up the liquid contained in the receptacle 8a by a preset amount with respect to the pump 8b, a control signal for adjusting the temperature of the liquid to a preset temperature with respect to the temperature control means 8c, and a control signal for discharging the liquid by a preset amount with respect to the pump 9a.

Subsequently, structural differences between the inverted microscope of the first embodiment and that of the comparative example will be explained.

First, the inverted microscope of the comparative example shown in FIG. 2, as illustrated in an enlarged way in FIG. 3, is constructed so that a top portion $8d'$ of the liquid pouring tube 8d provided as a liquid pouring section in the liquid pouring means 8 is fixed to the liquid receiving portion 2b of the immersion objective lens 2 and is shaped like a nozzle that extends to reduce in diameter from the side of the immersion objective lens 2 toward the proximity of the top lens surface 2a of the immersion objective lens 2, and the liquid is poured from the side of the top lens surface 2a through the tip of the nozzle.

A top portion $9c'$ of the discharge tube 9c of the discharge means 9 is fixed to a discharge port $2b'$ of the liquid receiving portion 2b of the immersion objective lens 2 so that the liquid stored in the liquid receiving portion 2b of the immersion objective lens 2 flows through the top portion $9c'$ of the discharge tube 9c and is discharged through the discharge port $2b'$.

However, like the inverted microscope of the comparative example shown in FIG. 2, in such a structure that the liquid is poured from the side of the immersion objective lens 2 through the top portion $8d'$ of the liquid pouring tube 8d extending to the proximity of the top lens surface 2a of the immersion objective lens 2, the top portion $8d'$ of the liquid pouring tube 8d is liable to interfere with the immersion objective lens 2 and the stage 1. When the immersion objective lens 2 is exchanged in accordance with the observation application, or when the relative positions of the stage 1 and the immersion objective lens 2 are shifted, there is a tendency that the top portion $8d'$ of the liquid pouring tube 8d collides with the immersion objective lens 2 and the stage 1, so that the liquid pouring position of the top portion $8d'$ of the liquid pouring tube 8d is shifted, and the liquid ceases to be pourable at a correct liquid pouring position. Consequently, the optimum amount of liquid is not poured between the specimen 12 and the immersion objective lens 2 and observation accuracy is liable to be impaired.

In the case where the top portion $8d'$ of the liquid pouring tube 8d is fixed to the immersion objective lens 2, for example, when a plurality of immersion objective lenses 2 are arranged in the objective switching device such as the revolver and are used, liquid pouring tubes equal in number to the immersion objective lenses 2 become necessary, but it is difficult to provide a space for arranging these liquid pouring tubes.

Furthermore, when the top portion $8d'$ of the liquid pouring tube 8d is fixed to the objective lens 2, it is impossible that an immersion objective lens 2 is removed from the objective switching device such as the revolver and is exchanged with another immersion objective lens or objective lens. Even though the top portion $8d'$ of the liquid pouring tube 8d is constructed to be removable from the immersion objective lens 2, the top portion $8d'$ of the liquid pouring tube 8d must be attached to the immersion objective lens 2 each time the immersion objective lens 2 is removed from the objective switching device and is exchanged with another immersion objective lens. This causes an obstacle that the positional adjustment of the top portion $8d'$ of the liquid pouring tube 8d becomes troublesome.

Similarly, in the structure that the top portion $9c'$ of the discharge tube 9c is connected to the immersion objective lens 2, like the case where the top portion $8d'$ of the liquid pouring tube 8d is fixed to the immersion objective tube 2, the top portion $9c'$ of the discharge tube 9c is liable to interfere with other members, a working space is difficult to be occupied, and an obstacle is liable to be caused to the exchange of the immersion objective lens 2.

In contrast to this, the inverted microscope of the first embodiment shown in FIG. 4, as illustrated in an enlarged way in FIG. 5, is constructed so that the liquid pouring tube 8d is fixed to the stage 1 in a state where the liquid pouring tube 8d passes through the inside of a part spaced away from the observation position on the stage 1 and the top portion $8d'$ extends perpendicular to the lower surface of the stage 1, the top portion $8d'$ of the liquid pouring tube 8d is relatively movable with respect to the immersion objective lens 2, and the liquid can be poured on the top lens surface 2a of the immersion objective lens 2 from the upper side of the immersion objective lens 2 at a distance from the observation position on the stage 1.

In the inverted microscope of the first embodiment, the control means 10 has the function of a position control means and is connected to a driving device for the stage 1, the immersion objective lens 2, or a supporting member (not shown) supporting the immersion objective lens 2, and a control signal for moving either the stage 1 or the immersion objective lens 2, or both, by preset amounts in horizontal and vertical directions is transmitted so that relative positions of the liquid pouring position (namely, the position of the top portion $8d'$ of the liquid pouring tube 8d) of the liquid pouring means 8 and the immersion objective lens 2 (more specifically, the top lens surface 2a) are thereby automatically adjusted and at the same time, relative positions of the immersion objective lens 2 on which the liquid is poured by the liquid pouring means 8 and a desired observation position on the stage 1 can be automatically adjusted.

The inverted microscope of the first embodiment is constructed so that the discharge tube 9c of the discharge means 9 is fixed to the stage 1 in a state where the discharge tube 9c passes through the inside of a part spaced away from the observation position on the stage 1 and the top portion $9c'$ extends perpendicular to the lower surface of the stage 1, and the top portion $9c'$ of the discharge tube 9c is relatively movable with respect to the immersion objective lens 2 and can be submerged perpendicular to the surface of the liquid stored in the liquid receiving portion 2b of the immersion objective 2 at a distance from the observation position on the stage 1 to pump up the liquid stored in the liquid receiving portion 2b. Specifically, the discharge means 9 is such that the liquid stored in the liquid receiving portion 2b is pumped through the top portion $9c'$ of the discharge tube 9c from the upper side.

According to the inverted microscope of the first embodiment constructed as mentioned above, the top portion 8d' of the liquid pouring tube 8d is designed so that the liquid can be poured on the top lens surface 2a of the immersion objective lens 2 from the upper side of the immersion objective lens 2 at a distance from the observation position on the stage 1, and hence it is avoidable that the top portion 8d' of the liquid pouring tube 8d interferes with the immersion objective lens 2 and the stage 1. When the immersion objective lens 2 is exchanged in accordance with the observation application or even when the relative positions of the stage 1 and the immersion objective lens 2 are shifted, the top portion 8d' of the liquid pouring tube 8d is prevented from colliding with the immersion objective lens 2 and the stage 1 and can be maintained at a correct liquid pouring position to pour the liquid. As a result, the optimum amount of liquid can be poured between the specimen 12 and the immersion objective lens 2 and a high degree of accuracy of observation can be maintained.

Further, according to the inverted microscope of the first embodiment, the top portion 8d' of the liquid pouring tube 8d is designed to be relatively movable with respect to the immersion objective lens 2, and therefore, for example, even when a plurality of immersion objective lenses 2 are arranged in the objective switching device such as the revolver and are used, the position of the top lens surface 2a of the individual switched immersion objective lens 2 can be adjusted to the same position of the top portion 8d' of the liquid pouring tube 8d. Consequently, the liquid pouring tubes equal in number to the immersion objective lenses 2 becomes unnecessary and the problem of an insufficient space for placing the liquid pouring tubes such as that in the inverted microscope of comparative example can be solved.

Moreover, when the top portion 8d' of the liquid pouring tube 8d is designed to be relatively movable with respect to the immersion objective lens 2, it can be facilitated that the immersion objective lens 2 is removed from the objective switching device such as the revolver and is exchanged with another immersion objective lens 2 or objective lens. Hence, there is no need to make the top portion 8d' of the liquid pouring tube 8d removable from the immersion objective lens 2 as in the inverted microscope of the comparative example shown in FIG. 2, and it is not necessary to make the positional adjustment of the top portion 8d' of the liquid pouring tube 8d each time the immersion objective lens 2 is removed from the objective switching device and is exchanged with another immersion objective lens.

Still further, according to the inverted microscope of the first embodiment, the control means 10 is such as to automatically adjust the relative positions of the liquid pouring position of the liquid pouring means 8 (namely, the position of the top portion 8d' of the liquid pouring tube 8d) and the immersion objective lens 2 (more specifically, the top lens surface 2a), as a position control means, and at the same time, the relative positions of the immersion objective lens 2 on which the liquid is poured by the liquid pouring means 8 and a desired observation position on the stage 1. Hence, the adjustment can be always made to a correct liquid pouring position and observation position without troubling an operator, and a high-precision observation can be carried out with respect to a desired specimen.

According to the inverted microscope of the first embodiment, the microscope is constructed so that the top portion 9c' of the discharge tube 9c is relatively movable with respect to the immersion objective lens 2 and is capable of pumping up the liquid stored in the liquid receiving portion 2a of the immersion objective lens 2 at a distance from the observation position on the stage 1. Thus, as in the case where the top portion 8d' of the liquid pouring tube 8d is made relatively movable with respect to the immersion objective lens 2, interference with other members can be prevented and the immersion objective lens 2 can be exchanged without any problem.

In addition, the inverted microscope of the first embodiment shown in FIG. 4, in contrast with the inverted microscope of the comparative example in FIG. 2, is provided with a cleaning member 13 for cleaning the top lens surface 2a of the immersion objective lens 2 at a distance from the observation position on the lower surface of the stage 1. The control means 10 is also designed to have the function of the position control means in which the relative positions of the immersion objective lens 2 and the cleaning member 13 can be shifted so that the top lens surface 2a of the immersion objective lens 2 can be rubbed against the cleaning member 13.

The cleaning member 13 is constructed with a member having preset elasticity, for example, unwoven cloth, such that when the top lens surface 2a is rubbed, dirt particles adhering to the top lens surface 2a can be eliminated without damaging the top lens surface 2a.

Thus, according to the inverted microscope of the first embodiment, in addition to being provided with the liquid pouring means 8 and the discharge means 9, the microscope has the function of automatically shifting the relative positions of the immersion objective lens and the desired observation position so that even when it is difficult for the viewer to clean directly the immersion objective lens, the top lens surface 2a of the immersion objective lens 2 can be cleaned by the cleaning member 13 in shifting the relative positions of the stage 1 and the immersion objective lens 2. Consequently, even though the microscope is used for a long period of time, the surface of the immersion objective lens can be kept in an uncontaminated state and high-precision observation and measurement can be maintained.

Also, the inverted microscope of the first embodiment shown in FIG. 4 is constructed so that the top portion 8d' of the liquid pouring tube 8d of the liquid pouring means 8 is fixed to the stage 1 and, when moved, is moved integrally with the stage 1. However, it may be constructed so that the top portion 8d' of the liquid pouring tube 8d of the liquid pouring means 8 is fixed to a supporting member (not shown) different from the stage 1 and is relatively moved with respect to the stage 1 when it is possible to relatively move the top portion 8d' with respect to the immersion objective lens 2, to automatically adjust the relative positions of the liquid pouring position of the liquid pouring means 8 and the immersion objective lens 2 through the control mean 10, and to automatically adjust the relative positions of the immersion objective lens 2 on which the liquid is poured by the liquid pouring means 8 and the desired observation position on the stage 1.

In the inverted microscope of the first embodiment, when it is possible to automatically adjust the relative positions of the liquid pouring position of the liquid pouring means 8 and the immersion objective lens 2 through the control means 10 and to automatically adjust the relative positions of the immersion objective lens 2 on which the liquid is poured by the liquid pouring means 8 and the desired observation position on the stage 1, both the stage 1 and the immersion objective lens 2 may be moved in a horizontal or vertical direction.

Further, when the top portion 8d' of the liquid pouring tube 8d of the liquid pouring means 8 is fixed to the supporting member (not shown) different from the stage 1 so that it is relatively moved with respect to the stage 1, the top portion 8d' of the liquid pouring tube 8 may be moved in a horizontal or vertical direction.

The inverted microscope of the first embodiment in FIG. 4 is designed so that the relative positions of the stage 1 and the immersion objective lens 2 are shifted and thereby the top portion 9c' of the discharge tube 9c is submerged perpendicular to the surface of the liquid stored in the liquid receiving portion 2b of the immersion objective lens 2. However, when the microscope is constructed so that the top portion 9c' of the discharge tube 9c is submerged perpendicular to the surface of the liquid stored in the liquid receiving portion 2b of the immersion objective lens 2, for example, the top portion 9c' of the discharge tube 9c is moved and thereby may be submerged perpendicular to the liquid receiving portion 2b of the immersion objective lens 2 located below the submergence position of the top portion 9c'.

For example, the discharge tube 9c may be designed to extend horizontally in a longitudinal direction so that the top portion 9c' is bent and to have a rotary axis in the longitudinal direction of the discharge tube 9c or in a horizontal direction perpendicular to the longitudinal direction of the discharge tube 9c so that the rotary axis is rotated and thereby the top portion 9c' is moved in directions in which it is submerged perpendicular to the surface of the liquid stored in the liquid receiving portion 2b and in which it deviates from the surface of the liquid.

The inverted microscope of the first embodiment in FIG. 4 is constructed so that the top portion 9c' of the discharge tube 9c is supported together with the liquid pouring tube 8d of the liquid pouring means 8 by the stage 1, and when the top lens surface 2a of the immersion objective lens 2 is located at the liquid pouring position of the top portion 8d' of the liquid pouring tube 8d, the top portion 9c' of the discharge tube 9c is located at the position where it can be submerged perpendicular to the surface of the liquid stored in the liquid receiving portion 2. By doing so, the supply of the liquid to the immersion objective lens 2 and the discharge of the liquid flowing from the immersion objective lens 2 can be performed simultaneously, and this raises the efficiency of operation. Also, the adjustment of the liquid pouring position of the top portion 8d' of the liquid pouring tube 8d may be made independently of that of the submergence position of the top portion 9c' of the discharge tube 9c.

Also, although in the inverted microscope of the first embodiment of FIG. 4 the cleaning member 13 is provided on the lower surface of the stage 1, it may be provided on the lower surface of a supporting member (not shown) supporting the liquid pouring means 8, independently of the stage 1. Alternatively, the cleaning member 13 may be provided on the lower surface of a supporting member (not shown) supporting the discharge means 9, independently of the stage 1.

The inverted microscope of the first embodiment in FIG. 4 is designed to mount the single immersion objective lens 2, but it may be such as to have a revolver in which a plurality of immersion objective lenses 2 can be switched.

In the inverted microscope of the first embodiment of FIG. 4, the immersion objective lens 2 may be exchangeable or may be fixed to a supporting member (not shown) to be unexchangeable. Even the application of the structure of the first embodiment to an inverted microscope provided with the unexchangeable immersion objective lens brings about the effect that interference with the liquid pouring means 8 or the discharge means 9 is prevented and the high-precision observation can be carried out.

Further, in the inverted microscope of the first embodiment of FIG. 4, it is desirable to make sequence control comprising the steps of:

(step 1) moving one of the stage 1 and the immersion objective lens 2 in a preset direction through the control means 10 to remove the observation position on the stage 1 from the optical axis of the immersion objective lens 2;

(step 2) moving at least one of the stage 1, the immersion objective lens 2, and the liquid pouring means 8 in a preset direction through the control means 10 to make positional adjustment so that the liquid pouring position of the liquid pouring means 8 is located in the proximity of the top lens surface 2a of the immersion objective lens 2;

(step 3) pouring a preset amount of liquid on the top lens surface 2a of the immersion objective lens 2 through the liquid pouring means 8;

(step 4) moving at least one of the stage 1, the immersion objective lens 2, and the liquid pouring means 8 in a preset direction through the control means 10 to remove the liquid pouring position of the liquid pouring means 8 from the proximity of the top lens surface 2a of the immersion objective lens 2;

(step 5) moving one of the stage 1 and the immersion objective lens 2 in a preset direction through the control means 10 to make positional adjustment so that a desired observation object mounted at the observation position on the stage 1 is located on the optical axis of the immersion objective lens 2;

(step 6) moving the immersion objective lens 2 in a direction of the optical axis with respect to the desired observation object mounted at the observation position on the stage 1 into alignment with the observation object; and (step 7) forming an image of the observation object aligned.

Alternatively, in the inverted microscope of the first embodiment of FIG. 4, it is desirable to make sequence control comprising the steps of:

(step 1) moving one of the stage 1 and the immersion objective lens 2 in a preset direction through the control means 10 to remove the observation position on the stage 1 from the optical axis of the immersion objective lens 2;

(step 2') moving at least one of the stage 1, the immersion objective lens 2, the liquid pouring means 8, and the discharge means 9 as the suction means in a preset direction through the control means 10 to make positional adjustment so that the liquid pouring position of the liquid pouring means 8 is located in the proximity of the top lens surface 2a of the immersion objective lens 2 and so that a suction position of the discharge means 9 as the suction means is located at the liquid receiving portion 2b of the immersion objective lens 2;

(step 3') pouring a preset amount, of liquid on the top lens surface 2a of the immersion objective lens 2 through the liquid pouring means 8 and pumping up the liquid stored in the liquid receiving portion 2b of the immersion objective lens 2 through the discharge means 9 as the suction means;

(step 4') moving at least one of the stage 1, the immersion objective lens 2, the liquid pouring means 8, and the discharge means 9 as the suction means in a preset direction through the control means 10 to remove the liquid pouring position of the liquid pouring means 8 from the proximity of the top lens surface 2a of the immersion objective lens 2 and to remove the suction position of the discharge means 9 as the suction means from the liquid receiving portion 2b of the immersion objective lens 2;

(step 5) moving one of the stage 1 and the immersion objective lens 2 in a preset direction through the control means 10 to make positional adjustment so that a desired observation object mounted at the observation position on the stage 1 is located on the optical axis of the immersion objective lens 2;

(step 6) moving the immersion objective lens 2 in a direction of the optical axis with respect to the desired observation object mounted at the observation position on the stage 1 into alignment with the observation object; and (step 7) forming an image of the observation object aligned.

When the microscope is constructed so that this sequence control is made, a high-precision microscope observation can be carried out with little operation load.

In the inverted microscope of the first embodiment, it is further desirable that, in any one of steps 1, 2 (2'), 4 (4'), and 5 in the above sequence, the top lens surface 2a of the immersion objective lens 2 is rubbed against the cleaning member 13. By doing so, the immersion objective lens can be cleaned without any operation load and efficiently.

Second Embodiment

Figure 6:
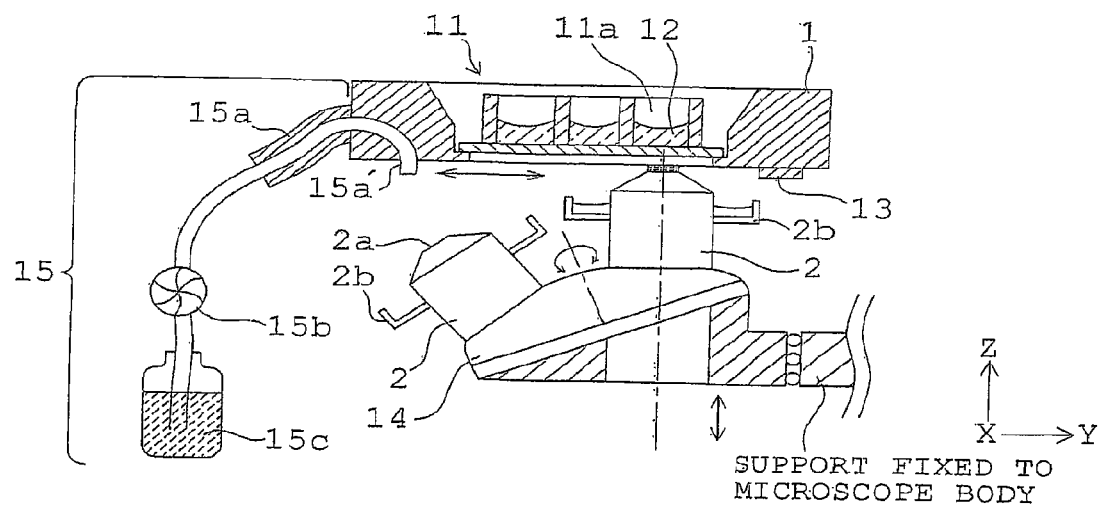
FIG. 6 is an explanatory view showing essential parts of the inverted microscope which is the observation apparatus provided with the immersion objective lens according to a second embodiment in the present invention.

FIG. 6 shows essential parts of the inverted microscope which is the observation apparatus provided with the immersion objective lens according to a second embodiment in the present invention. Also, in the inverted microscope of the second embodiment, like references are used for like members with respect to the inverted microscope of the first embodiment shown in FIG. 4.

The inverted microscope of the second embodiment has a revolver 14 so that a plurality of immersion objective lenses 2 are provided and can be switched by the revolver 14. In the inverted microscope of the second embodiment, a tubular member 15a combines the liquid pouring tube 8d of the liquid pouring means 8 with the discharge tube 9c of the discharge means 9 in the inverted microscope of the first embodiment. The tubular member 15a is fixed to the stage 1 in a state where the tubular member 15a passes through the inside of a part spaced away from the observation position on the stage 1 and a top portion 15a' extends perpendicular to the lower surface of the stage 1.

The tubular member 15a constitutes a liquid pouring and discharge means 15, together with a pump 15b and a receptacle 15c. The pump 15b is connected to a control means, not shown, (corresponding to the control means 10 in FIG. 4) and is driven so that the liquid contained in the receptacle 15c is fed in a direction in which the liquid is poured in accordance with a control signal from the control means or so that the liquid stored in the liquid receiving portion 2b of the immersion objective lens 2 is fed in a direction in which the liquid is discharged.

The stage 1 is constructed to be movable in an X-Y direction along a plane perpendicular to the optical axis of the immersion objective lens 2 located at the observation position. The revolver 14 is constructed to be movable in a direction perpendicular to a supporting section fixed to a microscope body (that is, in a Z direction along the optical axis). The amount of movement of the stage 1 in the X-Y direction and the amount of movement of the revolver 14 in the Z direction are controlled through the control means and thereby the top portion 15a' of the tubular member 15 can be relatively moved with respect to the immersion objective lens 2. At the same time, the liquid is poured on the top lens surface 2a of the immersion objective lens 2 from the upper side of the immersion objective lens 2 at a distance from the observation position on the stage 1 so that the top portion 15a' is submerged perpendicular to the surface of the liquid stored in the liquid receiving portion 2a of the immersion objective lens 2 and is capable of pumping up the liquid stored in the liquid receiving portion 2a. Other features are almost the same as in the inverted microscope of the first embodiment shown in FIG. 4.

According to the inverted microscope of the second embodiment, the tubular member 15a is such as to combine the liquid pouring tube 8d of the liquid pouring mean 8 with the discharge tube 9c of the discharge means 9 in the inverted microscope of the first embodiment, and thus the number of members and the cost can be reduced. Furthermore, even when the revolver 14 is provided with a large number of (immersion) objective lenses, interference with the objective lenses can be possibly avoided and a wider driving space for relatively adjusting the immersion objective lens 2 and the liquid pouring position by the liquid pouring means or the suction position by the discharge means provided as the suction means can be occupied to facilitate the positional adjustment. Other functions and effects are almost the same as in the inverted microscope of the first embodiment.

Third Embodiment

Figure 7:
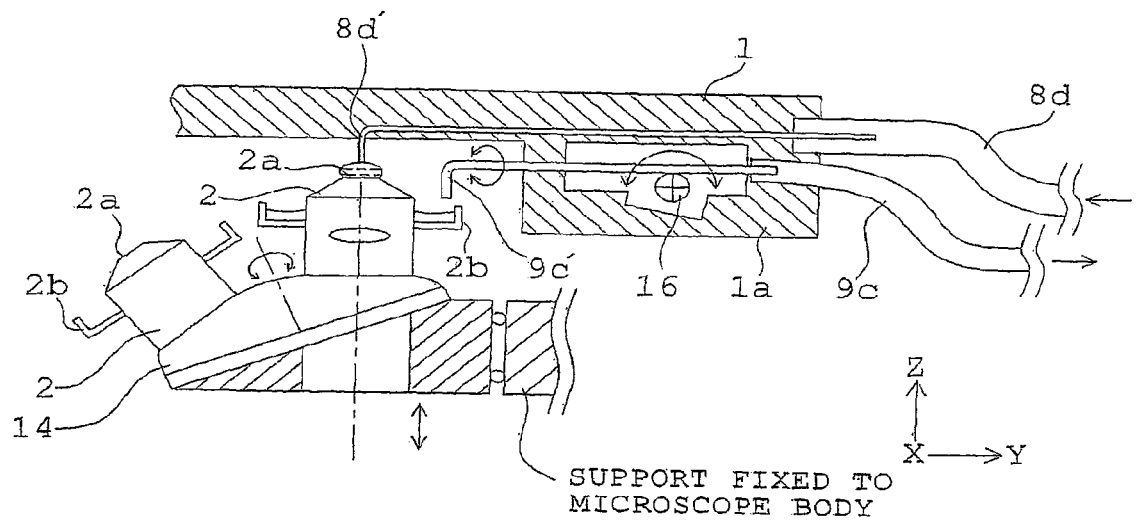
FIG. 7 is an explanatory view showing essential parts of the inverted microscope which is the observation apparatus provided with the immersion objective lens according to a third embodiment in the present invention.
Figure 8:
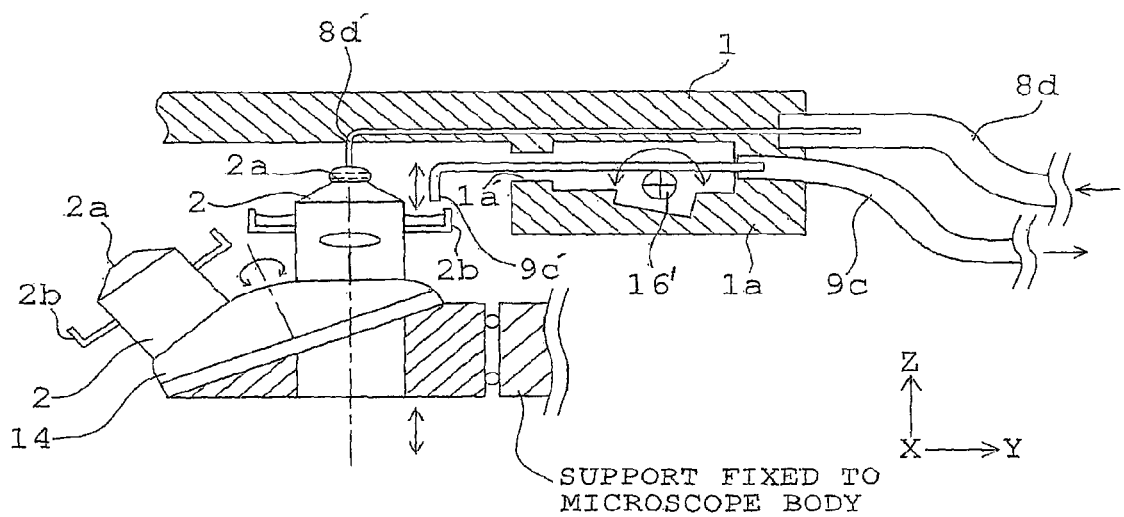
FIG. 8 is an explanatory view showing a modified example of essential parts in the inverted microscope of FIG. 7.

FIG. 7 shows essential parts of the inverted microscope which is the observation apparatus provided with the immersion objective lens according to the third embodiment in the present invention. FIG. 8 shows a modified example of essential parts in the inverted microscope of FIG. 7. Also, in the inverted microscope of the third embodiment, like references are used for like members with respect to the inverted microscope of the first embodiment shown in FIG. 4.

In the inverted microscope of the third embodiment, the discharge tube 9c, as shown in FIG. 5, is provided to pass through the inside of a lower portion 1a of the stage 1. The discharge tube 9c extends horizontally in a longitudinal direction so that its top portion 9c' is bent, and has a gear (not shown) in the longitudinal direction of the discharge tube 9c, which meshes with an intersecting axis 16 having a gear. By driving the intersecting axis 16, the discharge tube 9c is rotated, as a rotary axis with the longitudinal direction, so that the top portion 9c' is moved in directions in which it is submerged perpendicular to the surface of the liquid stored in the liquid receiving portion 2b and in which it deviates from the surface of the liquid.

The intersecting axis 16 is connected to a control means, not shown, (corresponding to the control means 10 in FIG. 4) and its amount and direction of rotation are controlled so that the top portion 9c' follows the directions in which it is submerged perpendicular to the surface of the liquid stored in the liquid receiving portion 2b and in which it deviates from the surface of the liquid.

The stage 1 is constructed to be movable in the X-Y direction along the plane perpendicular to the optical axis of the immersion objective lens 2 located at the observation position. The revolver 14 is constructed to be movable in the direction perpendicular to the supporting section fixed to the microscope body (that is, in the Z direction along the optical axis).

The amount of movement of the stage 1 in the X-Y direction and the amount of movement of the revolver 14 in the Z direction are controlled through the control means, not shown, (corresponding to the control means 10 in FIG. 4) and thereby the top portion 8d' of the liquid pouring tube 8d can be relatively moved with respect to the immersion objective lens 2. At the same time, the liquid is poured on the top lens surface 2a of the immersion objective lens 2 from the upper side of the immersion objective lens 2 at a distance from the observation position on the stage 1. By controlling the amount of movement of the stage 1 in the X-Y direction, the amount of movement of the revolver 14 in the Z direction, and the amount of direction of rotation of the intersecting axis 16 through the control means, not shown, (corresponding to the control means 10 in FIG. 4), the top portion 9c' of the discharge tube 9c is submerged perpendicular to the surface of the liquid stored in the liquid receiving portion 2a of the immersion objective lens 2 so that the liquid stored in the liquid receiving portion 2a can be pumped up. Other features, functions, and effects are nearly the same as the inverted, microscope of the first embodiment.

Also, in the inverted microscope of the third embodiment shown in FIG. 7, the discharge tube 9c extends horizontally in a longitudinal direction so that its top portion 9c' is bent, and has a gear (not shown) in the longitudinal direction of the discharge tube 9c, which meshes with the intersecting axis 16 having a gear; and by driving the intersecting axis 16, the discharge tube 9c is rotated, as a rotary axis with the longitudinal direction, so that the top portion 9c' is moved in directions in which it is submerged perpendicular to the surface of the liquid stored in the liquid receiving portion 2b and in which it deviates from the surface of the liquid. However, as in the modified example illustrated in FIG. 8, the microscope may be constructed so that an opening 1a' that the discharge tube 9c can be moved by a desired amount is provided on the objective-lens-2 side of the lower portion 1a of the stage 1; the discharge tube 9c in the longitudinal direction is fixed to an axis 16' perpendicular to the longitudinal direction; and by driving the axis 16', the discharge tube 9c is rotated, as a rotary axis with the longitudinal direction, and the top portion 9c' is moved in directions in which it is submerged perpendicular to the surface of the liquid stored in the liquid receiving portion 2b and in which it deviates from the surface of, the liquid. Even in such a structure, the same effect as that of FIG. 7 is brought about.

The observation apparatus provided with the immersion objective lens of the present invention is useful in the field in which it is particularly required to carry out microplate sample observation and time-lapse observation, or observation combining these, by interposing the liquid between the observation object, such as a living specimen, and the objective lens placed below the observation object.

What is claimed is:

1. An observation apparatus provided with an immersion objective lens, in which an observation object mounted at an observation position on a stage is observed through the immersion objective lens placed below the observation object, the observation apparatus comprising:
    liquid pouring means, constructed to be relatively movable with respect to the immersion objective lens and for pouring a liquid on a top lens surface of the immersion objective lens from an upper side of the immersion objective lens at a distance from the observation position on the stage; and
    position control means for automatically adjusting relative positions of a liquid pouring position of the liquid pouring means and the immersion objective lens and automatically adjusting relative positions of the immersion objective lens on which the liquid is poured by the liquid pouring means and a desired observation position on the stage,
    wherein, the liquid pouring means is configured with liquid pouring section for pouring the liquid perpendicular to the top lens surface of the immersion objective lens located at the liquid pouring position, and the liquid pouring means is constructed so that the liquid pouring section is movable together with the stage.

2. The observation apparatus provided with an immersion objective lens according to claim 1, wherein the position control means is constructed so that the stage can be moved by a desired amount in a horizontal direction.

3. The observation apparatus provided with an immersion objective lens according to claim 1, wherein the position control means is constructed so that the liquid pouring section of the liquid pouring means can be moved by a desired amount in a horizontal direction.

4. An observation apparatus provided with an immersion objective lens in which an observation object mounted at an observation position on a stage is observed through the immersion objective lens placed below the observation object, the observation apparatus comprising:
    liquid pouring means, constructed to be relatively movable with respect to the immersion objective lens and for pouring a liquid on a top lens surface of the immersion objective lens from an upper side of the immersion objective lens at a distance from the observation position on the stage;
    position control means for automatically adjusting relative positions of a liquid pouring position of the liquid pouring means and the immersion objective lens and automatically adjusting relative positions of the immersion objective lens on which the liquid is poured by the liquid pouring means and a desired observation position on the stage;
    a liquid receiving portion for storing a liquid flowing from the top lens surface, mounted around the immersion objective lens; and
    suction means, constructed to be relatively movable with respect to the immersion objective lens and for pumping up the liquid stored in the liquid receiving portion of the immersion objective lens at a distance from the observation position on the stage,
    wherein the suction means is configured with a suction portion which can be submerged perpendicular to a surface of the liquid stored in the liquid receiving portion of the immersion objective lens.

5. The observation apparatus provided with an immersion objective lens according to claim 4, wherein the suction portion is movable with respect to a position where the suction portion is submerged perpendicular to the surface of the liquid stored in the liquid receiving portion of the immersion objective lens and a position where the suction portion deviates from the surface of the liquid stored in the liquid receiving portion.

6. The observation apparatus provided with an immersion objective lens according to claim 5, wherein the suction portion is constructed with a tubular member which extends horizontally in a longitudinal direction and in which a top is bent, and has a rotary axis in the longitudinal direction of the tubular member so that the rotary axis is rotated and thereby the top of the suction portion is moved in directions in which the top is submerged perpendicular to the surface of the liquid stored in the liquid receiving portion and in which the top deviates from the surface of the liquid.

7. The observation apparatus provided with an immersion objective lens according to claim 5, wherein the suction portion is constructed with a tubular member which extends horizontally in a longitudinal direction and in which a top is bent, and has a rotary axis in a horizontal direction perpendicular to the longitudinal direction of the tubular member so that the rotary axis is rotated and thereby the top of the suction portion is moved in directions in which the top is submerged perpendicular to the surface of the liquid stored in the liquid receiving portion and in which the top deviates from the surface of the liquid.

8. The observation apparatus provided with an immersion objective lens according to claims 4, wherein the suction means is supported by a support member common with the liquid pouring means, and when the top lens surface of the immersion objective lens is located at the liquid pouring position of the liquid pouring means, the top of the suction portion is located at a position where the top can be submerged perpendicular to the surface of the liquid stored in the liquid receiving portion.

9. The observation apparatus provided with the immersion objective lens according to claim 1 or 4, wherein the immersion objective lens is provided to be exchangeable.

10. The observation apparatus provided with an immersion objective lens according to claim 1 or 4, further comprising a revolver in which a plurality of immersion objective lenses can be switched.

11. The observation apparatus provided with an immersion objective lens according to claim 1 or 4, wherein the observation apparatus is controlled in accordance with sequential control process comprising:

moving one of the stage and the immersion objective lens in a preset direction through the position control means to remove the observation position on the stage from an optical axis of the immersion objective lens;

moving at least one of the stage, the immersion objective lens, and the liquid pouring means in a preset direction through the position control means to make positional adjustment so that the liquid pouring position of the liquid pouring means is located in the proximity of the top lens surface of the immersion objective lens;

pouring a preset amount of liquid on the top lens surface of the immersion objective lens through the liquid pouring means;

moving at least one of the stage, the immersion objective lens, and the liquid pouring means in a preset direction through the position control means to remove the liquid pouring position of the liquid pouring means from the proximity of the top lens surface of the immersion objective lens;

moving one of the stage and the immersion objective lens in a preset direction through the position control means to make positional adjustment so that a desired observation object mounted at the observation position on the stage is located on the optical axis of the immersion objective lens;

moving the immersion objective lens in a direction of the optical axis with respect to the desired observation object mounted at the observation position on the stage into alignment with the observation object; and forming an image of the observation object aligned.

12. An observation apparatus provided with an immersion objective lens according to claim 4, wherein the observation apparatus is controlled in accordance with sequential control process comprising:

moving one of the stage and the immersion objective lens in a preset direction through the position control means to remove the observation position on the stage from an optical axis of the immersion objective lens;

moving at least one of the stage, the immersion objective lens, the liquid pouring means, and a suction means in a preset direction through the position control means to make positional adjustment so that the liquid pouring position of the liquid pouring means is located in the proximity of the top lens surface of the immersion objective lens and so that a suction position of the suction means is located at the liquid receiving portion of the immersion objective lens;

pouring a preset amount of liquid on the top lens surface of the immersion objective lens through the liquid pouring means and pumping up the liquid stored in the liquid receiving portion of the immersion objective lens through the suction means;

moving at least one of the stage, the immersion objective lens, the liquid pouring means, and the suction means in a preset direction through the position control means to remove the liquid pouring position of the liquid pouring means from the proximity of the top lens surface of the immersion objective lens and to remove the suction position of the suction means from the liquid receiving portion of the immersion objective lens;

moving one of the stage and the immersion objective lens in a preset direction through the position control means to make positional adjustment so that a desired observation object mounted at the observation position on the stage is located on the optical axis of the immersion objective lens;

moving the immersion objective lens in a direction of the optical axis with respect to the desired observation object mounted at the observation position on the stage into alignment with the observation object; and forming an image of the observation object aligned.

* * * * *